United States Patent Office 3,702,237
Patented Nov. 7, 1972

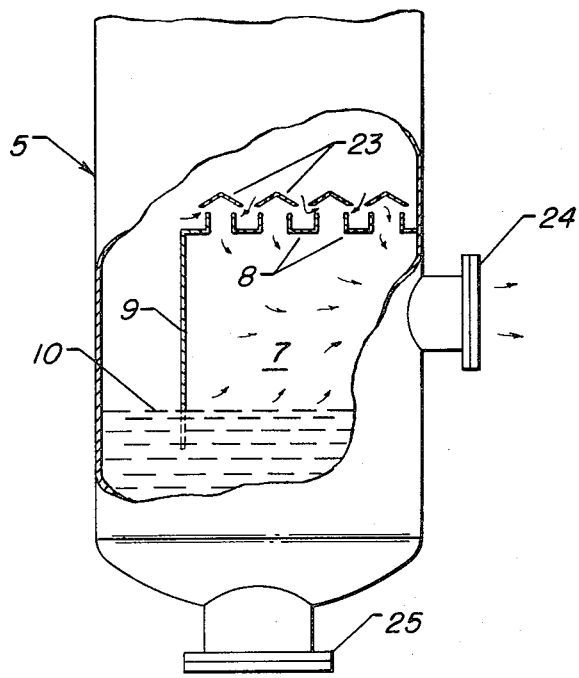
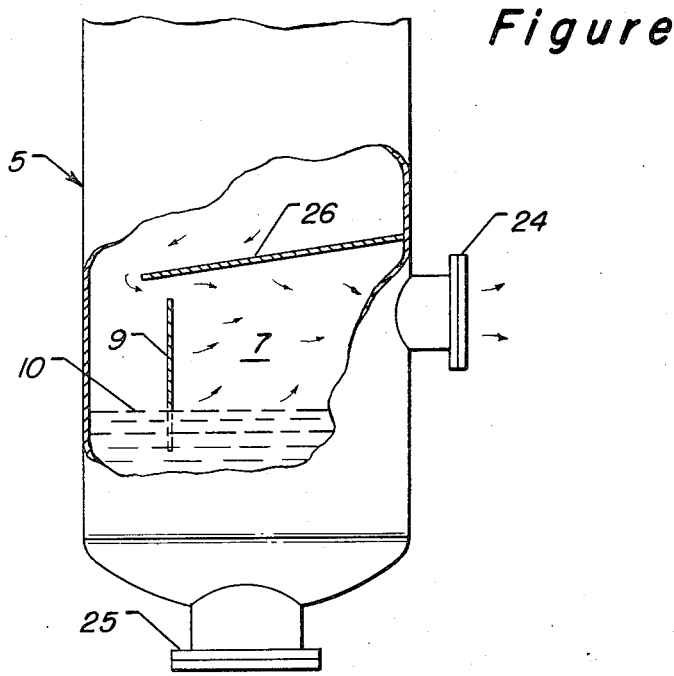

3,702,237
HYDROCARBON CONVERSION APPARATUS
Charles H. Watkins, Arlington Heights, Ill., assignor to Universal Oil Products Company, Des Plaines, Ill.
Filed July 2, 1970, Ser. No. 51,900
Int. Cl. B01j 9/04
U.S. Cl. 23—288 R                                1 Claim

ABSTRACT OF THE DISCLOSURE

A hydrocarbon conversion apparatus or vessel for use in mixed-phase, fixed-bed catalytic systems. The vessel is equipped with an internal vapor-liquid separation compartment from which a principally vaporous phase is removed. Removal of this vaporous phase significantly inhibits foaming in the outlet line through which the product effluent is withdrawn.

APPLICABILITY OF INVENTION

The invention herein described is adaptable for utilization in a process for the conversion of hydrocarbons, in which process the mixed-phase product effluent is withdrawn from the reaction zone and introduced into a hot separation zone at substantially the same temperature and pressure. More particularly, the present invention is directed toward an apparatus for the conversion of the heavier fractions derived from petroleum crude oil including vacuum tower bottoms products, crude oil residua, topped crude oils, crude oils extracted from tar sands, etc., all of which are commonly referred to in the art as "black oils."

Petroleum crude oils, particularly the heavy oils extracted from tar sands, topped or reduced crudes, and vacuum residuum, etc., contained high molecular weight sulfurous and nitrogenous compounds in exceedingly large quantities. In addition, these black oils contain high molecular weight organo-metallic complexes, principally comprising nickel and vanadium, and asphaltenic material. The latter is generally found to be complexed with sulfur, and, to a certain extent, with the organo-metallic contaminants. An abundant supply of such hydrocarbonaceous material currently exists, most of which has a gravity less than about 25.0° API, and a significant quantity of which has a gravity less than about 10.0° API. Furthermore, these black oils are generally characterized by a boiling range indicating that at least 10.0% by volume boils above a temperature of about 1050° F.

The hydrocarbon conversion reaction vessel which constitutes my invention is especially adaptable for use in a process for effecting the catalytic conversion of black oils to a variety of lower-boiling normally liquid products including motor fuels, jet fuel kerosene fractions, various gas oil fractions, and fuel oils which meet current specifications with respect to sulfur content. Specific examples of the black oils, illustrative of those to which the use of the present catalytic reaction zone is applicable, include a vacuum tower bottoms product having a gravity of 7.1° API and containing 4.05% by weight of sulfur and 23.7% by weight of asphaltenic material; a "topped" Middle-East Kuwait crude oil, having a gravity of 11.0° API, and containing 10.1% by weight of asphaltenes and 5.20% by weight of sulfur; and a vacuum residuum having a gravity of 8.8° API, and containing 3.0% by weight of sulfur and about 4,300 p.p.m. of nitrogen, and having a 20.0% volumetric distillation temperature of 1055° F.

PRIOR ART

Investigations instituted with respect to the conversion of hydrocarbonaceous black oils, to produce a multitude of lower-boiling hydrocarbon products, have resulted in a variety of processing techniques. Although some processing schemes are non-catalytic, at least in part, the art indicates a tendency to utilize one or more catalytic composites in the well known fixed-bed manner. Illustrative of such fixed-bed catalytic processes are the following U.S. Pats.: 3,364,134; 3,371,029; 3,371,030; 3,375,189; and, 3,445,377. The common ingredient of these processes involves the treatment of the product effluent from a first catalytic reaction zone. Briefly the product effluent, in total, is withdrawn from the initial reaction zone and introduced into a hot separation zone at substantially the same pressure and temperature as it emanates from the reaction zone. The stated purpose of this external hot separator is to provide a principally vaporous phase and a principally liquid phase, both of which are subsequently further separated by a variety of techniques peculiar to the particular process, and for the purpose of achieving a particularly desired end result. Such separation techniques generally include cold, high-pressure separation zones, cold flash zones and hot flash zones, the latter including vacuum columns. The principal difficulty attendant these processes stems from the fact that the total product effluent is withdrawn, for example, from a reaction vessel having a ten-foot diameter by way of and through a transfer line having a ten-inch diameter. As will be recognized, this technique greatly increases the linear velocity of the effluent while the same is being transferred to the hot separation zone. This, in turn, gives rise to a significant foaming problem within the hot separation zone, and results in (1) inefficient separation as noted by mist and foam in the vapor, and gas bubbles included in the liquid, and (2) operational difficulties caused thereby. In accordance with the technique encompassed by the present inventive concept, the relatively low linear velocity experienced within the reaction vessel is maintained with the result that foaming is significantly inhibited and minimized. As hereinbefore set forth, the present technique involves the utilization of a conversion zone having a vapor-liquid separation zone as an internal, integral part of the reaction vessel. In addition to the benefits arising as a result of the suppression of foaming tendencies, economic considerations are enhanced through the elimination of the external vessel which serves as the hot separation zone of the prior art processes.

OBJECTS AND EMBODIMENTS

An object of the present invention is to provide a process for the conversion of hydrocarbonaceous black oils into lower-boiling hydrocarbon products. A corollary objective involves a conversion reaction vessel having a vapor-liquid separation compartment as an internal, integral part thereof.

Another object of my invention is to reduce the foaming tendency of the product effluent as it is withdrawn from the hydrocarbon conversion reaction zone.

Still another object is to improve black oil conversion processes whereby the same may be effected in a more facile manner, and in a more economical fashion.

Therefore, in one embodiment, the present invention provides a hydrocarbon conversion apparatus comprising in combination: (a) a substantially elongated enclosed vessel; (b) a feed inlet port in the upper portion of said vessel; (c) at least two effluent outlet ports in the lower portion of said vessel; and, (d) a vapor-liquid separation zone within the lower portion of said vessel, said separation zone having one of said effluent outlet ports and being in hindered open communication with the remaining portion of said vessel.

In another embodiment, the present invention is directed toward a process for the conversion of hydrocarbonaceous black oil into lower-boiling hydrocarbon products, which process comprises reacting said black oil and hydrogen in a catalytic reaction zone, and contact therein with a hydrocarbon conversion catalyst, internally separating the reaction products into a principally vaporous phase and a principally liquid phase and recovering said lower-boiling products from said liquid phase.

Other objects and embodiments will become apparent from the following further description of the present invention, and particularly from the description of the several embodiments illustrated in the accompanying drawings.

SUMMARY OF INVENTION

The hydrocarbon conversion reaction zone which constitutes the present invention is utilized to significant advantage in those processes designed to effect the conversion of hydrocarbonaceous black oils. In view of the fact that the operating conditions under which the conversion of black oil is effected are not essential to my invention, only a brief description of these conditions is believed necessary. Black oil conversion conditions generally include maximum catalyst bed temperatures in the range of about 700° F. to about 900° F. Since the bulk of the reactions being effected are exothermic the reaction zone effluent will be at a higher temperature than exists at the inlet to the catalyst bed. In order to preserve catalyst stability, the inlet temperature is controlled at a level such that the temperature of the reaction product effluent does not exceed about 900° F. Hydrogen is admixed with the black oil charge stock by means of compressive recycle in an amount in the range of about 5,000 to about 50,000 s.c.f./bbl., at the selected operating pressure. The black oil passes through the fixed-bed of catalyst at a liquid hourly space velocity (defined as volumes of liquid hydrocarbon charge per hour, as measured at 60° F., per volume of catalyst disposed in the reaction zone) of from about 0.25 to about 3.0. In view of the fact that both hydrogenation and hydrocracking reactions are effected, there will be a net consumption of hydrogen; to supplement this, hydrogen is added to the system from any suitable external source.

Likewise, the utilization of any particular, specific catalytic composite, to effect the black oil conversion reactions, is not considered an essential feature of the present invention. The catalytic composite disposed within the reaction zone can be characterized as comprising at least one metallic component composited with a suitable refractory inorganic oxide carrier material which may be either synthetic or natural in origin. The present invention contemplates the use of those catalytic composites traditionally employed in the prior art processes. Such catalytic composites contain metallic components selected from the group consisting of the metals of Groups VI-B and VIII of the Periodic Table, as indicated in the Periodic Table of The Elements, E. H. Sargent and Company, 1964. Thus, suitable metallic components include molybdenum, tungsten, chromium, iron, cobalt, nickel, platinum, palladium, iridium, osmium, rhodium, ruthenium, and mixtures thereof. The concentration of the catalytically active metallic component, or components, is dictated by the particular metal as well as the physical and chemical characteristics of the black oil charge stock. The refractory inorganic oxide carrier material may comprise alumina, silica, zirconia, magnesia, titania, boria, strontia, hafnia, and mixtures of two or more. Furthermore, the carrier material may be amorphous or zeolitic, the latter often being referred to as a crystalline aluminosilicate.

DESCRIPTION OF DRAWINGS

The present invention is illustrated in the accompanying drawings, one of which is a simplified flow diagram in which such details as pumps, instrumentation and controls, heat-exchange and heat-recovery circuits, valving, compressors, start-up lines and similar hardware have been eliminated or reduced in number as being non-essential to an understanding of the techniques involved. The use of such miscellaneous appurtenances, to modify the illustrative process flow, are well within the purview of those skilled in the art.

With reference now to the drawings.

FIG. 2 is an enlarged view of a section of the bottom portion of reaction zone 5 illustrating one particular configuration of separation zone 7.

FIG. 3 is similar to FIG. 2 in that it indicates a section of the lower portion of reaction zone 5 having, however, a different configuration with respect to vapor-liquid separation zone 7.

Referring now to FIG. 1, the black oil charge stock enters the process by way of line 1, and is combined with a hydrogen-rich recycle phase in line 2; the mixture continues through line 1 into heater 3. The heated mixture is introduced by way of line 4 through an inlet port in the upper portion of reaction zone 5. As the charge stock and hydrogen traverse catalyst bed 6, the exothermic reactions cause the temperature gradient to increase with the result that a considerable portion of the reaction product exists in the vapor phase in the lower portion of reaction zone 5. As indicated, reaction zone 5 is equipped internally with separation zone 7 which consists, in this illustration, of a vertically-disposed baffle 9 terminating at its one end in contact with the substantially horizontally-disposed baffle 8, the latter being in the form of the well known bubble-cap tray. As a result of the bubble-cap openings and horizontally-disposed baffle 8, separation zone 7 is in hindered open communication with the remaining portion of reaction zone 5. The lower portion of vertically-disposed baffle 9 terminates at a locus above the lowermost portion of reaction zone 5. In a preferred operation, separation zone 7 is sealed at the lower end of vertically-disposed baffle 9 by way of liquid level 10 being controlled through the use of liquid level control system 11. The trapped vapors pass through the openings in horizontally-disposed baffle 8 and are withdrawn from separation zone 7 by way of line 12 as a principally vaporous phase. The principally liquid phase is withdrawn by way of line 14, containing flow control valve 15 which is being monitored by liquid level control system 11. Following its use as a suitable heat-exchange medium, the principally vaporous phase in line 12, without substantial reduction in pressure, is introduced into cold separator 13 at a temperature in the range of about 60° F. to about 140° F.

Figure 1:
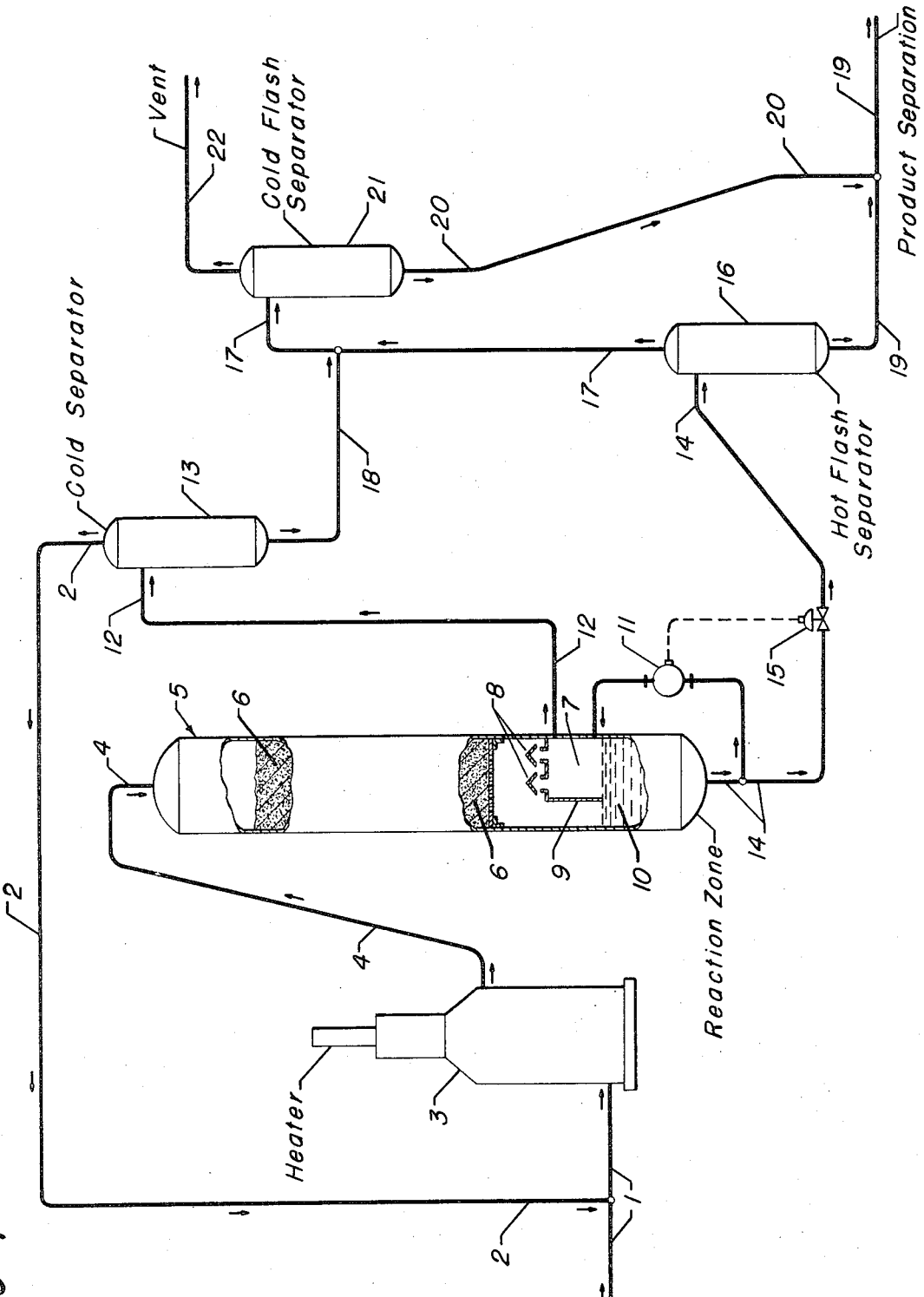
FIG. 1 is a simplified flow diagram of a black oil conversion process. In this drawing, reaction zone 5 is presented in cut-away view to indicate the fixed-bed of catalyst 6 and the internal vapor-liquid separation zone 7.

Cold separator 13 serves primarily to supply a hydrogen-rich gaseous phase in line 2 which is ultimately recycled to combine with the black oil charge stock in line 1. Condensed hydrocarbons are removed from cold separator 13 by way of line 18. Prior to being recycled, the hydrogen-rich gaseous phase may be treated in any suitable manner for the removal of hydrogen sulfide and normally gaseous paraffins, methane, ethane and propane, in order to increase the hydrogen concentration. Make-up hydrogen, to supplant that consumed in the overall process is generally introduced to the system by way of the recycle line 2, and upstream from compressor means, the latter not being illustrated. Hot flash separator 16, into which the liquid phase from reaction zone 5 is introduced by way of line 14, functions at an elevated temperature somewhat less than the temperature of the liquid phase introduced, but at a lower super-atmospheric pressure of about 200 p.s.i.g. This provides another principally vaporous phase in line 17 which, following a reduction in temperature, is admixed with the liquid phase in line 18 and introduced into cold flash separator 21. The normally liquid phase from hot flash separator 16 is withdrawn by way of line 19 and introduced into suitable product separation facilities. Another principally vaporous phase, consisting primarily of normally gaseous hydrocarbons is removed from cold flash separator 21, being vented to flue gas through line 22. The normally liquid phase is withdrawn by way of line 20, and may be conveniently combined with the product in line 19 for further separation in suitable product separation facilities.

FIG. 2 constitutes an enlarged view of a section of the lower portion of reaction zone 5 containing two product outlet ports 24 and 25 for vapor and liquid withdrawal, respectively. Separation zone 7 is shown as consisting of a substantially horizontal baffle 8 containing openings illustrated as bubble caps 23, and vertical baffle 9 which terminates at one end in contact with horizontally disposed baffle 8 and at the other end a finite distance above the lowermost portion of reaction zone 5. As hereinbefore set forth, a preferred technique involves maintaining a liqiud level 10 in contact with the lowermost portion of vertically-disposed baffle 9.

FIG. 3 indicates another modification with respect to separation zone 7. In this configuration, vertically-disposed baffle 9 terminates at its upper end a finite distance below horizontally-disposed baffle 26 which is inclined from 5° to about 45° In this instance, it is preferred that the horizontal, but inclined baffle 26 be void of any openings therein. The flow of vapors through separation zone 7 is indicated by a multiplicity of small arrows. Other modifications to separation zone 7 will become evident to those skilled in the art; these will depend primarily upon the operating conditions employed, the desired degree of separation to be effected and the physical and chemical characteristics of the black oil charge stock.

I claim as my invention:

1. A conversion apparatus comprising a vertically elongated enclosed vessel having a feed inlet port in its upper portion, a horizontally-disposed bubble-cap tray extending from a wall of the vessel partially across the lower portion of the vessel, a vertically-disposed baffle in contact with and extending downwardly from the inner end of said tray and terminating above the lowermost portion of the vessel, said tray and baffle forming a vapor-liquid separation compartment in the lower portion of said vessel, a vapor outlet port in the upper portion of said compartment below said tray and a liquid outlet port at the lowermost portion of said compartment.

References Cited

UNITED STATES PATENTS 3,147,210   9/1964   Hass et al. _____ 208—143 XR

JAMES H. TAYMAN, JR., Primary Examiner

U.S. Cl. X.R.

23—283; 55—178, 183, 257; 208—108, 143